United States Patent [19]

Iwata

[11] 4,112,447
[45] Sep. 5, 1978

[54] FLASH AND CAMERA DEVICE
[75] Inventor: Hiroshi Iwata, Osaka, Japan
[73] Assignee: West Electric Co, Ltd., Osaka, Japan
[21] Appl. No.: 777,351
[22] Filed: Mar. 14, 1977
[30] Foreign Application Priority Data
Mar. 17, 1976 [JP] Japan .................. 51-29511
[51] Int. Cl.² ........................... G03B 17/38
[52] U.S. Cl. .................. 354/145; 354/266
[58] Field of Search ........... 354/266, 268, 145, 147; 200/52 R, 61.58 R

[56] References Cited
U.S. PATENT DOCUMENTS
3,997,775  12/1976  Stoneham ................ 354/145 X
FOREIGN PATENT DOCUMENTS
1,203,132  10/1965  Fed. Rep. of Germany ........ 354/145
2,535,972   2/1976  Fed. Rep. of Germany ........ 354/145
2,251,756   4/1974  Fed. Rep. of Germany ........ 354/145

Primary Examiner—L. T. Hix
Assistant Examiner—William B. Perkey
Attorney, Agent, or Firm—Stevens, Davis, Miller & Mosher

[57] ABSTRACT

A flash and camera device having in combination a photographic camera device and an electronic flash device in which energy stored in a main discharge capacitor is consumed by a flash discharge tube to emit flash light is provided with a switch having at least a pair of electric contacts which is connected to the electronic flash device and a power supply battery and which functions when closed to electrically enable the supply of power from the power supply battery to the electronic flash device, a switch closing means for closing the electric contacts and maintaining them in closed position, and a releasing means interlocked to a shutter button of the photographic camera device to be moved with the depression of the shutter button to release the closure of the electric contacts by the closing means.

3 Claims, 4 Drawing Figures

F I G. 1
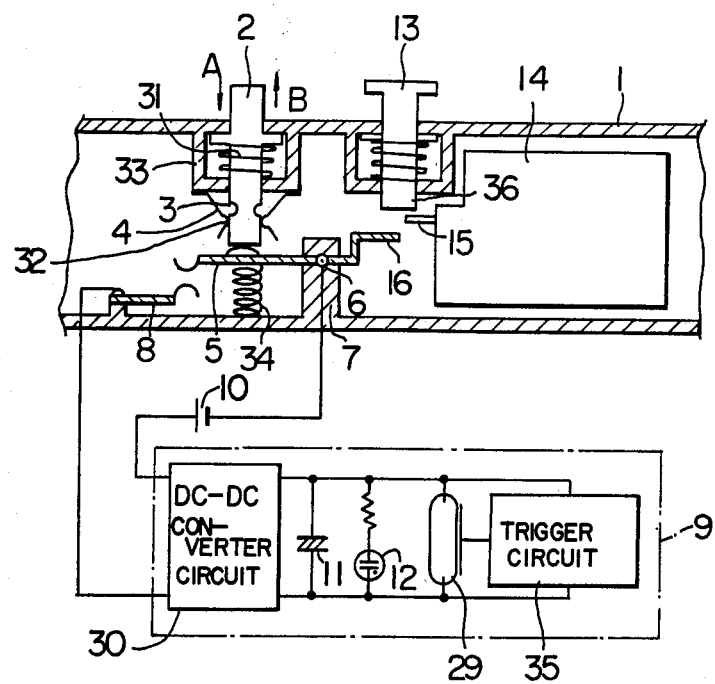
F I G. 2
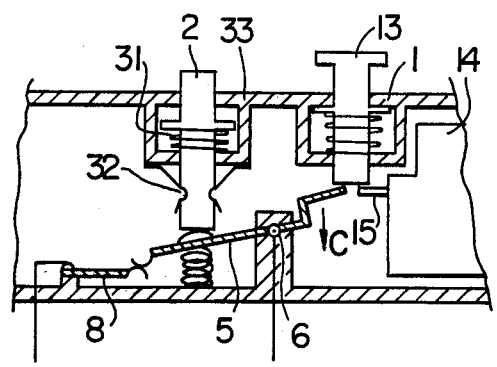

FLASH AND CAMERA DEVICE

The present invention relates to a flash and camera device which integrally incorporates an electronic flash device and a photographic camera device, and more particularly to a means which prevents a power loss of a power supply battery which otherwise occurs when a user fails to turn off a power switch to the electronic flash device.

In a prior art flash and camera device which integrally incorporates an electronic flash device and a photographic camera device, a mechanical slide switch or snap switch has been used in general as a power switch for the electronic flash device. When a brightness of an object is so low that the operation of the electronic flash device is required, the power switch is manually turned on to apply the power of the power supply battery to the electronic flash device to carry out flash mode photographing, and the power switch is manually turned off after the photographing.

However, since the turn-on and turn-off operations of the power switch is manually done, a user may frequently fail to turn off the power switch after the flash mode photographing. In such a case, an electric energy of the power supply battery may be wasted so much that the battery cannot assure a predetermined number of times of flash operation. If the power switch is left on for a long time period, the electric energy of the battery will be completely consumed so that a new power supply battery will be required when the electronic flash device is again used.

It is, therefore, an object of this invention to provide a flash and camera device wherein the aforementioned drawbacks encountered in the prior art is eliminated.

Other objects and advantages of the present invention will become apparent from the following description when it is considered in conjunction with the accompanying drawings.

FIG. 1 shows an embodiment of a flash and camera device of the present invention and it shows a sectional view of a major mechanical section thereof and an electric circuit diagram of an electronic flash device;

FIG. 2 shows a power supply switch means in the embodiment of FIG 1, in its actuated state;

Figure 3:
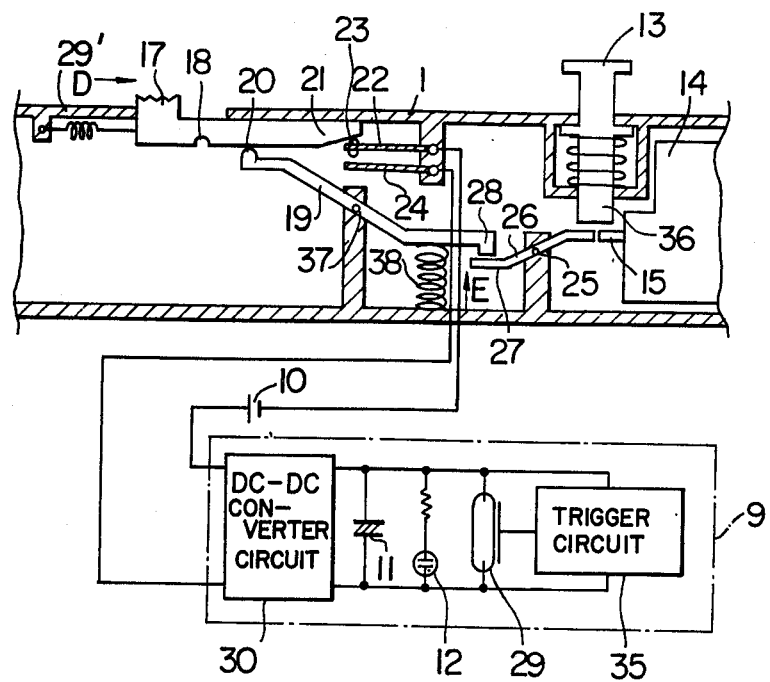
FIG. 3 shows another embodiment of the flash and camera device of the present invention and it shows a sectional view of a major mechanical section thereof and an electric circuit diagram of an electronic flash device.

Referring to FIG. 1, the flash and camera device of the present invention comprises a housing 1 which includes a well-known shutter mechanism and lenses and has a power supply switching means and a shutter button, an electronic flash device 9 integrally mounted in the housing 1, and a power supply battery 10.

The operation of the flash and camera device of the construction described above is now explained for (1) a flash photographing mode of operation where a brightness of an object to be photographed is so low that the operation of the electronic flash device is required, and (2) a natural light photographing mode of operation where the brightness of the object is high.

(1) FLASH PHOTOGRAPHING MODE OF OPERATION

When a movable member 2 which is normally biased upward by a spring 31 mounted in a chamber 33 attached to the housing 1 is depressed in the direction of an arrow A, a projecting end 32 of an elastic engaging member 4 attached to the chamber 33 at a position shown in the drawing engages a notch 3 of the movable member 2 as shown in FIG. 2 so that the movable member 2 is maintained at the depressed position.

As the movable member 2 is depressed, a pivotable electric contact 5 which is pivotally mounted to a pivot pin 6 attached to a support member 7 of the housing 1 and which is normally biased to a position shown in FIG. 1 by a spring force 34, is moved to contact a stationary electric contact 8 as shown in FIG. 2. This contact condition is maintained until the engaging member 4 is disengaged from the notch 3 to allow the movable member 2 to be restored to the position of FIG. 1 by the spring force of the spring 31. The movable member 2 constitutes a switch closing element for the switch formed by the electric contacts 5 and 8. Notch 3 functions as a first engaging member while engaging member 4 serves as a second engaging member. Together they constitute a lock acting on movable member 2.

Accordingly, while the contact condition of FIG. 2 is maintained, the switch comprising the electric contact 5 connected to a negative terminal of the power supply battery 10 and the electric contact 8 connected to a conventional DC-DC converter circuit 30 is closed so that the power supply battery 10 is connected to the electronic flash device 9. As a result, the DC-DC converter 30 is activated to produce a stepped-up D.C. output, by which a main discharge capacitor 11 is charged.

When the main discharge capacitor 11 is charged to a fixed level, a firing indicator 12 is lit. Then it becomes possible for a user to initiate the flash photographing mode of operation by depressing the shutter button 13. More particularly, as the shutter button 13 is depressed, a shutter lever 15 in the shutter mechanism 14 is moved downward to operate the shutter mechanism 14 (which may be a conventional mechanical shutter mechanism which operates to impart a spring force charged during the winding of a film to a shutter vane driving member in response to the movement of the shutter lever for actuating shutter vanes) to actuate the shutter.

Being interlocked with the opening operation of the shutter mechanism 14, a trigger circuit 35 is activated in a well-known manner to apply a high voltage triggering pulse to a flash discharge tube 29 to cause it to emit flash light by the energy stored in the main discharge capacitor 11. In this manner, the flash photographing mode of operation is carried out.

Simultaneously with the depression of the shutter button 13, a bottom end 36 of the shutter button 13 pushes an end 16 of the electric contact 5 which functions as a releasing member so that electric contact 5 is pivoted in the direction of an arrow C, thereby the projection 32 of the engaging member 4 is disengaged from the notch 3 to allow the movable member 2 to be moved in the direction of an arrow B by the spring force of the spring 31, and the electric contact 5 is restored to the position shown in FIG. 1 by the spring force of the spring 34. End 16, spring 31 and spring 34 constitute a releasing mechanism for member 2.

Accordingly, the electric contact of the contacts 5 and 8 is broken and the supply of power from the battery 10 to the electronic flash device 9 is stopped.

(2) NATURAL LIGHT PHOTOGRAPHING MODE OF OPERATION

By depressing only the shutter button 13 while keeping the movable member 2 in the state shown in FIG. 1, the shutter lever 15 is depressed to activate the shutter mechanism 14 so that the natural light photographing mode of operation by only the opening and closing of the shutter is achieved.

As described above, in the first embodiment of the present invention, after the power supply battery 10 has been connected to the electronic flash device 9 by the manual operation, the connection of the power supply battery 10 is necessarily disconnected by the depression of the shutter button 13 so that a problem encountered in the prior art device, that is, the waste of the power of the power supply battery 10 by the failure of turning off of a bistable type switch, can be completely eliminated.

FIG. 3 shows another embodiment of the flash and camera device of the present invention. In this embodiment, components which have the same functions as in the first embodiment shown in FIGS. 1 and 2 have the same reference numerals and are not otherwise explained.

(1) FLASH PHOTOGRAPHING MODE OF OPERATION

Figure 4:
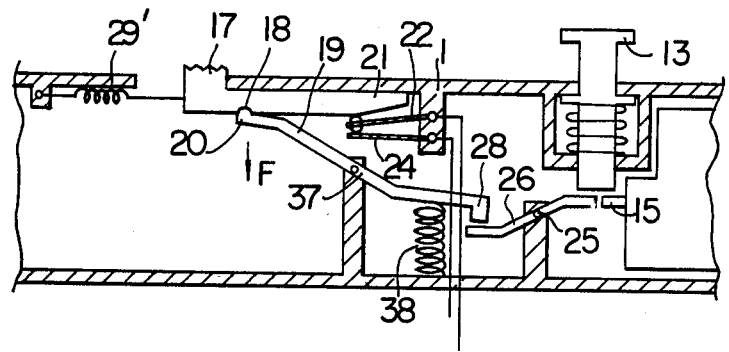
FIG. 4 shows a power supply switch means in the embodiment of FIG. 3, in its actuated state.

When a slidable member 17 which is provided in the housing 1 and normally biased at the position shown in FIG. 3 by a tensile force of a spring 29 is slid in the direction of an arrow D, a projection 20 of an engaging member 19 engages a recess 18 formed in the slidable member 17 so that the slidable member 17 is locked in the position shown in FIG. 4. The slidable member 17 constitutes a switch closing element. The recess 18 and the projection 20 serve as first and second engaging members which together constitute a lock acting on slidable member 17.

As the slidable member 17 is moved in the direction D, elastic electric contacts 22 and 24 which are connected to the electronic flash device 9 and the power supply battery 10 respectively and are not electrically contacted with each other in the state shown in FIG. 3, are brought into contact as shown in FIG. 4 as a ramp 21 formed on the slidable member 17 biases a projection 23 of the contact 22 so that power from the battery 10 is supplied to the electronic flash device 9; that is, contacts 22 and 24 constitute a switch.

When the shutter button 13 is depressed after the main discharge capacitor 11 has been charged to a fixed level, the flash discharge tube 29 emits flash light as the operation of the shutter mechanism 14 is carried out as described above, thus, the flash photographing mode of operation is carried out.

As the shutter button 13 is depressed, a pivotable member 26 supported pivotably by an axis 25 is depressed by the bottom end 36 of the shutter button 13 so that an end 27 of the pivotable member 26 is pivoted in the direction of an arrow E.

The movement of the end 27 causes an end 28 of the engaging member 19, which is supported pivotably by an axis 37 and is normally biased downward at the end 28 by a tensile force of a spring 38, to move upward in the direction of E. This in turn causes the projection 20 to move downward in the direction shown by an arrow F to disengage the engagement of the recess 18 with the slidable member 17.

By the release of the engagement of the projection 20 with the recess 18, the slidable member 17 is restored to the position shown in FIG. 3 by the tensile force of the spring 29'. Thus, the electric contact of the contacts 22 and 24 are broken and the supply of the power of the power supply battery 10 to the electronic flash device 9 is automatically stopped. The pivotable member 26 constitutes a coupling member and the spring 29' constitutes a restoring member for slidable member 17.

(2) NATURAL LIGHT PHOTOGRAPHING MODE OF OPERATION

By depressing the shutter button 13 while keeping the slidable member 17 in its position as shown in FIG. 3, the natural light photographing mode of operation is carried out in the same way as described in connection with the first embodiment.

Thus, like in the first embodiment, in the second embodiment the power supply to the electronic flash device is automatically released by the depression of the shutter button. Accordingly, the afore-mentioned wasteful power loss of the power supply battery can be prevented. Furthermore, since the state or state in movement of the members such as the movable member and the slidable member can be visually verified, the disconnection of the power accurately can be more surely identified.

What is claimed is:

1. A flash and camera device having in combination a photographic camera device and an electronic flash device in which energy stored in a main discharge capacitor is consumed by a flash discharge tube to emit flash light, comprising:
   a power supply battery;
   a switch having a pair of electric contacts which when closed connects said power supply battery to said electronic flash device;
   a closing means movable between a switch opening and switch closing position for closing said switch;
   a lock means for maintaining said closing means in said switch closing position; and
   a releasing means operative in response to the depression of a shutter button of said photographic camera device for releasing said lock means and allowing said closing means to move to said switch opening position.

2. A flash and camera device according to claim 1, wherein said electrical contacts are movable relative to one another and said closing means includes a movable member operable when depressed to relatively move said electric contacts and bring them into electrical contact with each other, and said lock means includes a first engaging member provided on said movable member and a second engaging member provided separately from said movable member and adapted to be engageable with said first engaging member when said movable member is in a depressed position, and said releasing means includes a releasing member coupled to one of said electric contacts, said releasing member being movable with the depression of said shutter button to move said movable member upward from said depressed position and release the engagement of said first and second engaging members, and a restoring member for restoring said movable member to its position before depression following release of the engagement of said first and second engaging members.

3. A flash and camera device according to claim 1, wherein said electrical contacts are movable relative to one another and said closing means includes a slidable member mounted in a housing of said flash and camera device and operable when slid to relatively move said electric contacts and bring them into electrical contact with each other, and said lock means includes a first engaging member provided on said slidable member and a second engaging member provided separately from said slidable member and adapted to be engageable with said first engaging member when said slidable member brings said electrical contacts together, and said releasing means includes a coupling member responsive to the depression of said shutter button for releasing the engagement of said first and second engaging members, and a restoring member for restoring said slidable member to a position where said electric contacts disengage from each other after the release of the engagement of said first and second engaging members.

* * * * *